United States Patent [19]
Babcock

[11] Patent Number: 5,954,523
[45] Date of Patent: *Sep. 21, 1999

[54] DUAL-IN LINE UNIVERSAL SERIAL BUS CONNECTOR

[75] Inventor: Sean R. Babcock, Portland, Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/959,962

[22] Filed: Oct. 24, 1997

Related U.S. Application Data

[63] Continuation of application No. 08/559,181, Nov. 13, 1995, abandoned.

[51] Int. Cl.$^6$ .................................................. H01R 13/648
[52] U.S. Cl. .................................................. 439/79
[58] Field of Search ........................... 439/79, 76.1, 80, 439/638, 682, 540.1, 620; 361/777, 760; 174/255, 260, 261, 262, 266, 267

[56] References Cited

U.S. PATENT DOCUMENTS

| | | | |
|---|---|---|---|
| 4,686,506 | 8/1987 | Farago | 439/620 |
| 5,254,018 | 10/1993 | Sawada | 439/901 |
| 5,269,708 | 12/1993 | DeYoung et al. | 439/676 |
| 5,306,180 | 4/1994 | Buhr | 439/620 |
| 5,532,954 | 7/1996 | Bechtolsheim et al. | 365/52 |
| 5,549,480 | 8/1996 | Cheng | 439/682 |
| 5,772,453 | 6/1998 | Tan et al. | 439/567 |

OTHER PUBLICATIONS

1995, Molex Incorporated 950 Full Line Catalog p. A–31.
*AMPLIMITE Subminiture D Connectors,* Catalog 82068 (Revised Mar. 1995) 128–129, 169.

*Primary Examiner*—Paula Bradley
*Assistant Examiner*—Tho D. Ta
*Attorney, Agent, or Firm*—Blakely, Sokoloff, Taylor & Zafman

[57] ABSTRACT

A dual-in-line Universal Serial Bus connector including a plurality of Universal Serial Bus ports oriented adjacent to each other in a longitudinal direction. The dual-in-line Universal Serial Bus connector further includes a plurality of signal pins and a pair of mounting tabs. The signal pins are coupled to the plurality of Universal Serial Bus ports in order to receive data input into at least one of the plurality of Universal Serial Bus ports. The positioning of the mounting tabs and signal pins enable this connector to be used as a substitute for a serial communication (COM) port connector.

17 Claims, 5 Drawing Sheets

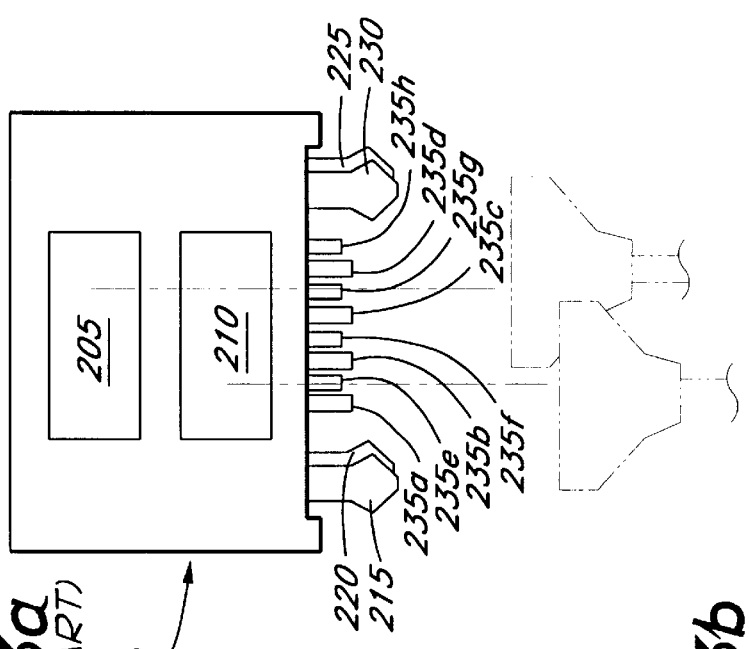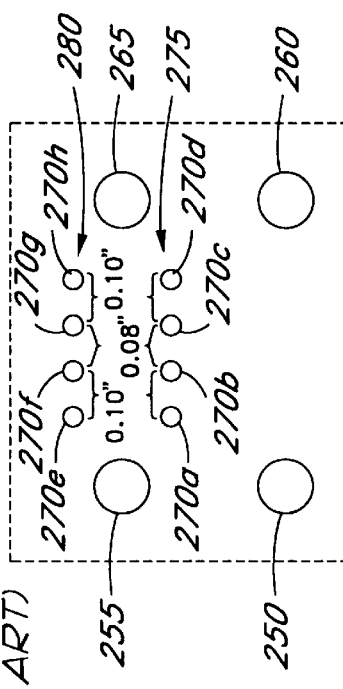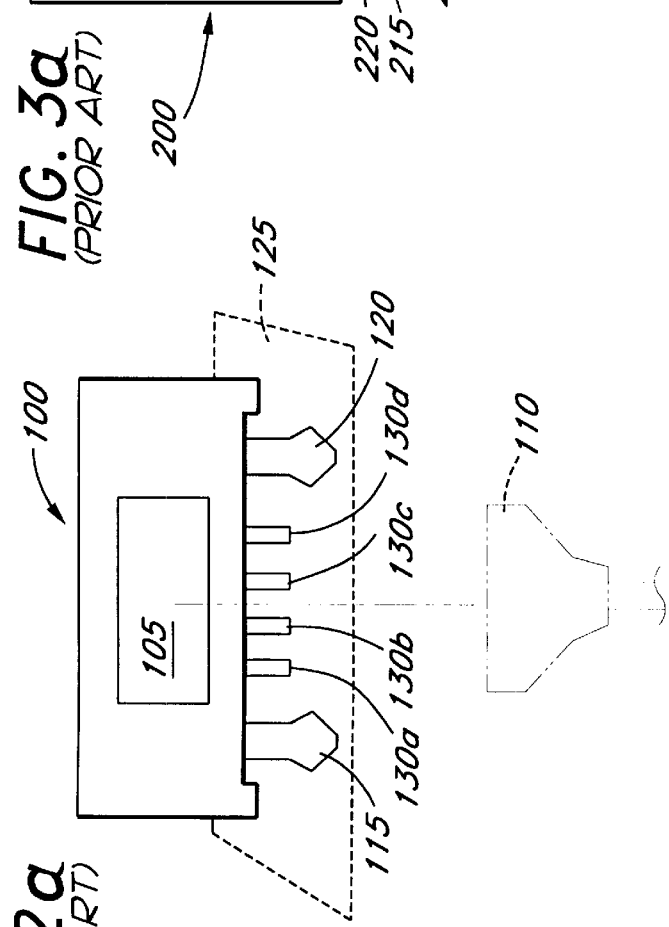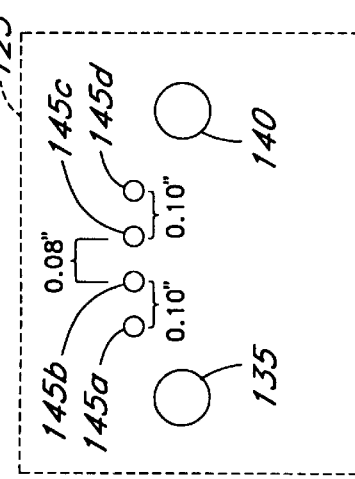
FIG. 3a (PRIOR ART)
FIG. 3b (PRIOR ART)
FIG. 2a (PRIOR ART)
FIG. 2b (PRIOR ART)

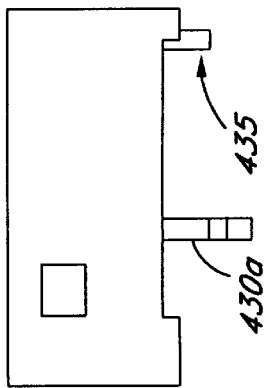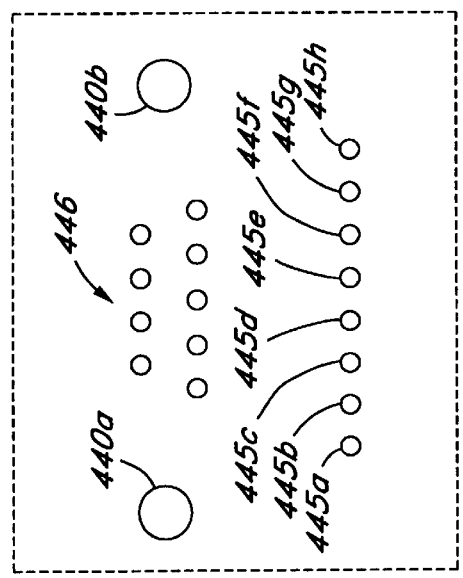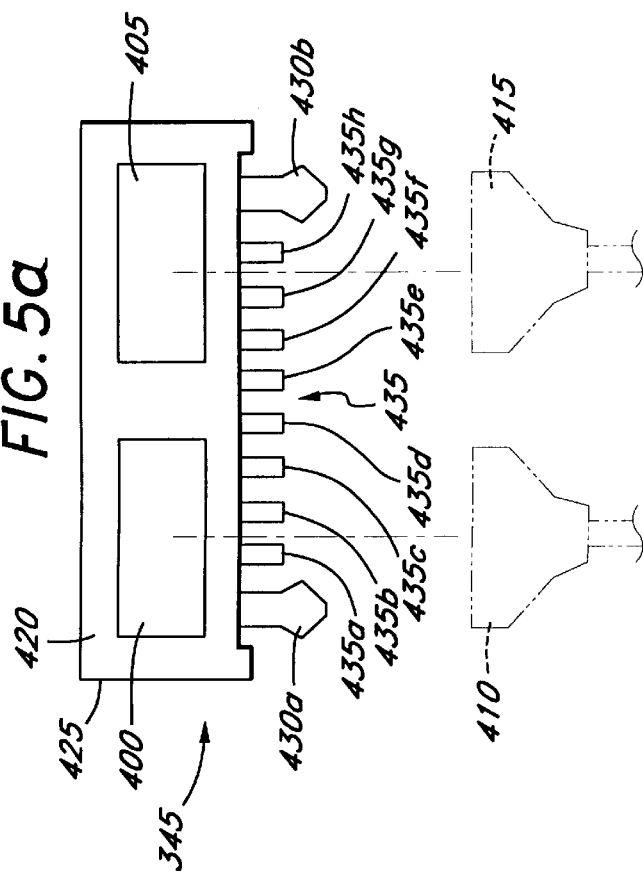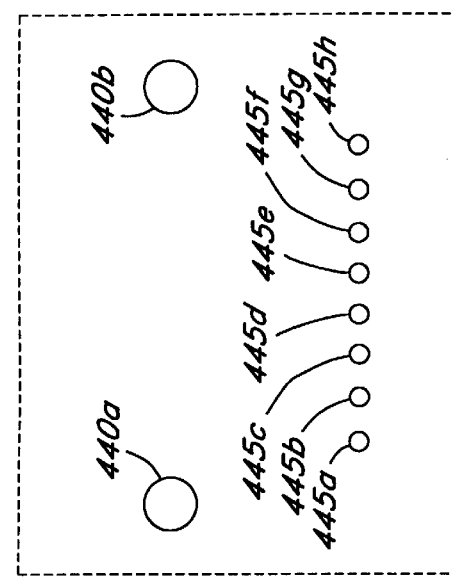

DUAL-IN LINE UNIVERSAL SERIAL BUS CONNECTOR

CROSS-REFERENCES TO RELATED APPLICATIONS

This is a continuation of a U.S. patent application (application Ser. No. 08/559,181) filed Nov. 13, 1995, now abandoned.

BACKGROUND OF THE INVENTION

1. Field of the Invention

The present invention relates to the field of electronic connectors. More particularly, the present invention relates to dual-in-line Universal Serial Bus ("USB") connector.

2. Description of Art Related to the Invention

For many years, personal computers ("PCs") have been designed with one or more circuit boards which are electrically coupled together in order to perform various operations. One of these circuit boards, namely the "motherboard", utilizes connectors to enable input/output ("I/O") peripherals to communicate with primary electronic components of the computer such as, for example, its processor(s), "I/O" controller and the like. As shown in FIG. 1, a PC 1 includes a number of connectors accessible from a backside of its chassis 10. These connectors include (i) a pair of audio plugs 20 and 25 which allow audio to be input from a transmitting source (e.g., a microphone) and output to a receiving source (e.g. speakers), (ii) a keyboard connector 30, (iii) a mouse connector 40, (iv) a display connector 50, (v) a parallel port connector 60 enabling one or more data bits to be communicated to or from the PC 1 and (vi) a pair of serial communication (COM) port connectors 70 and 75, individually referred to as a "COM1 port connector" and a "COM2 port connector". In general, each of these COM port connectors is a standard 9-pin D-Sub connector which is well-known in the art.

Recently, the computer industry has made significant efforts to develop a "plug and play" environment for PCs which have lead to the development of two types of Universal Serial Bus ("USB") connectors; namely, a standard USB connector as shown in FIGS. 2a–2b and a "stacked" USB connector as shown in FIGS. 3a–3b. These USB connectors offer a number of advantages. One advantage is that, unlike COM port connectors, USB connectors employ a two signal differential communication scheme which allows more than one USB peripheral to be connected to a single USB port. Another advantage associated with the differential communication scheme is that it provides a data link capable of operating at a faster transmission rate than conventional serial links.

Referring now to FIG. 2a, the standard USB connector 100 comprises a USB port 105 sized to receive a USB adapter 110 of a USB-compatible peripheral in order to establish an electrical connection with that USB-compatible peripheral. The USB connector 100 further comprises (i) a pair of mounting tabs 115 and 120 which are soldered to a motherboard 125 in order to establish a strong connection thereto and (ii) four signal pins 130a–130d having the following pin definitions in compliance with Universal Serial Bus Specification Revision 0.99.

| PIN No. | DESCRIPTION |
| --- | --- |
| Pin 1 (130a) | $V_{cc}$ |
| Pin 2 (130b) | –DATA |
| Pin 3 (130c) | +DATA |
| Pin 4 (130d) | GND |

As shown in FIG. 2b, in the event that the standard USB connector 100 is a throughhole connector requiring holes to be precut into the motherboard 125 to accommodate the mounting tabs 115 and 120 and signal pins 130a–130d, a typical board layout footprint required for the standard USB connector of FIG. 2a is shown. The footprint includes a pair of mounting holes 135 and 140, which are sized and spaced to accommodate the mounting tabs 115 and 120, and four signal pin holes 145a–145d arranged so that the signal pins 130a–130d of FIG. 2a are inserted therethrough once the mounting tabs 115 and 120 are soldered at the mounting holes 135 and 140. Since the signal pins 130a–130d are not separated by a uniform distance, namely the first and second pins 130a and 130b as well as the third and fourth pins 130c and 130d are separated by approximately 0.10 inches while the second and third pins 130b and 130c are separated by approximately 0.08 inches, a customized, costly 1×4 stake pin connector would be required to cable the USB connections to another location on the motherboard 125.

Referring to FIG. 3a, the stacked USB connector 200 provides a first USB port 205 and a second USB port 210 for two USB adapter plugs. The USB ports 205 and 210 are arranged vertically to minimize the amount of board space needed on the motherboard 125. The stacked USB connector 200 includes four mounting tabs 215, 220, 225 and 230 which, are soldered to the motherboard 125 like the standard USB connector of FIG. 2a. The stacked USB connector 200 further includes eight (8) signal pins 235a–235h which are horizontally aligned in two four-pin groups such that pins 235a–235d provide connections for the first USB port 205 and pins 235e–235h provide connections for the second USB port 210. The signal pins 235a–235h comply with the USB Specification Revision 0.99 for each port of the stacked USB connector and are defined as follows:

| PIN No. | DESCRIPTION |
| --- | --- |
| Pin 1 (235a) | $V_{cc}$ for USB Port 1 |
| Pin 2 (235b) | –DATA for USB Port 1 |
| Pin 3 (235c) | +DATA for USB Port 1 |
| Pin 4 (235d) | GND for USB Port 1 |
| Pin 5 (235e) | $V_{cc}$ for USB Port 2 |
| Pin 6 (235f) | –DATA for USB Port 2 |
| Pin 7 (235g) | +DATA for USB Port 2 |
| Pin 8 (235h) | GND for USB Port 2 |

As shown in FIG. 3b, in the event that the stacked USB connector 200 is a throughhole connector requiring holes to be precut into the motherboard 125 to accommodate the mounting tabs 215, 220, 225 and 230 and signal pins 235a–235h, a typical board layout footprint required for the stacked USB connector 200 of FIG. 3a is shown. The footprint includes four mounting holes 250, 255, 260 and 265, which are sized and spaced to accommodate the mounting tabs 215, 220, 225 and 230, respectively. The footprint further includes eight (8) signal pin holes 270a–270h arranged in two, four-hole groupings 275 and 280 in a manner similar to the signal pin holes 145a–145d of the standard USB connector of FIG. 2b but instead having two aligned groupings 275 and 280 instead of just one grouping.

These conventional USB connectors have a number of disadvantages. For example, certain low-profile motherboards require their components to be shorter a maximum height to guarantee that a sufficient distance is maintained between the inner walls of the chassis of the PC and the motherboard. Thus, in some situations, stacked USB connectors may not be used. Although it is contemplated that the standard USB connector may be used as the alternative, it does not provide dual USB ports which can, among other things, be used to initially support two USB-compatible peripherals. Furthermore, two standard USB connectors placed side-by-side could not be used to provide dual USB ports because the collective width of the two standard USB connectors exceeds the board width allocated to the COM port connector.

It is desirable to develop and configure a new type of USB connector as an alternative to one of two COM port connectors (i.e., support an optional configuration of one COM port connector and a dual-in-line USB connector instead of two COM port connectors) for two primary reasons. One reason is that the elimination of a COM port connector still provides support for serial communication through the other COM port connector. The second reason is that many countries around the World rely heavily on the availability of two COM port connectors and may not initially accept USB technology. This allows motherboard manufacturers an ability to produce a single motherboard that is capable of supporting either USB and dual COM options.

Therefore it would be advantageous to develop a dual in-line USB connector, compatible with low-profile motherboards, that would comply with the board width constraints associated with the COM port connector as well as utilize the same mounting holes used by the COM port connector. It would be also advantageous to develop the dual-in-line connector with signal pins separated by a uniform distance so that standard stake pin connectors, instead of custom stake pin connectors, can be used to cable one or both of the USB connections to another location on the motherboard.

BRIEF SUMMARY OF THE INVENTION

The present invention relates to a dual-in-line Universal Serial Bus connector comprising (i) a plurality of Universal Serial Bus ports oriented adjacent to each other in a longitudinal direction and (ii) a plurality of signal pins, electrically coupled to said plurality of Universal Serial Bus ports, to receive data input into at least one of said plurality of Universal Serial Bus ports. The dual-in-line Universal Serial Bus connector is configured to be implemented with the same general circuit board area reserved from a standard 9-pin D-Sub connector, typically used as a serial COM port connector.

BRIEF DESCRIPTION OF THE DRAWINGS

The features and advantages of the present invention will become apparent from the following detailed description in combination with the figures listed below.

FIG. 2a is a front view of a standard USB connector before it is connected to the motherboard.

FIG. 2b is an overhead view of a board layout footprint required by the standard USB connector of FIG. 2a.

FIG. 3a is a front view of a stacked USB connector before it is connected to the motherboard.

FIG. 3b is an overhead view of a board layout footprint required by the stacked USB connector of FIG. 3a.

FIG. 5a is an illustrative, front view of the dual-in-line USB connector before it is connected to the motherboard.

FIG. 5b is an illustrative, side view of the dual-in-line USB connector showing the offset distance between the mounting tab and the signal pins.

FIG. 5c is an illustrative overhead view of the board layout footprint required by the dual-in-line USB connector.

FIG. 5d is an illustrative overhead view of the board layout footprint required by the dual-in-line USB connector or alternatively a 9-pin COM port connector.

DETAILED DESCRIPTION OF THE INVENTION

The present invention relates to a dual-in-line USB connector. In the following description, numerous specific details are set forth, such as specific size and spacing measurements and the like. It is apparent, however, to one skilled in the art that these exact measurements are not required to practice the present invention.

Figure 1:
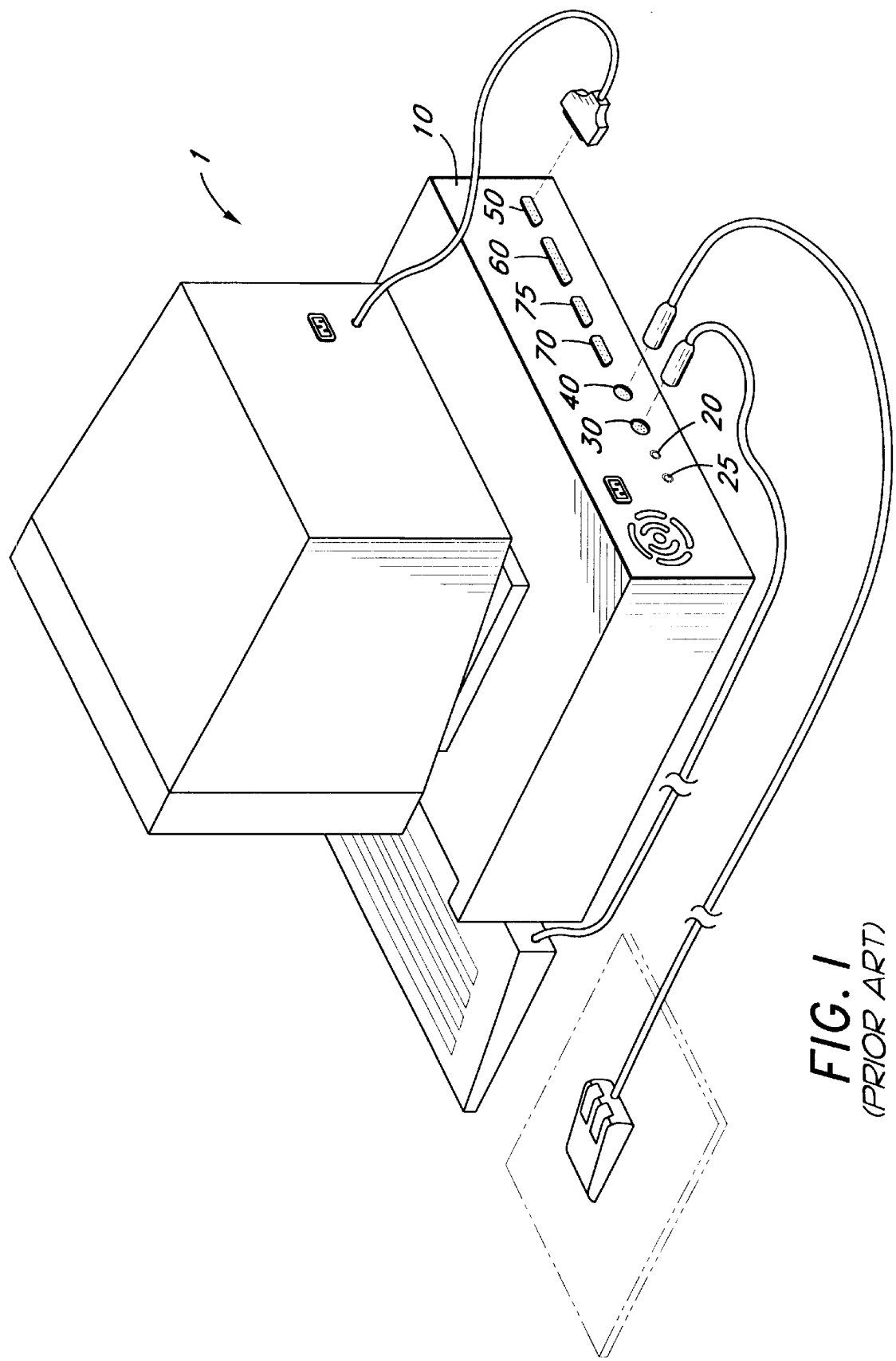
FIG. 1 is a perspective view from a backside of a conventional personal computer ("PC") in which a number of connectors coupled to the motherboard of the PC are accessible to receive adapter plugs from peripheral devices.
Figure 4:
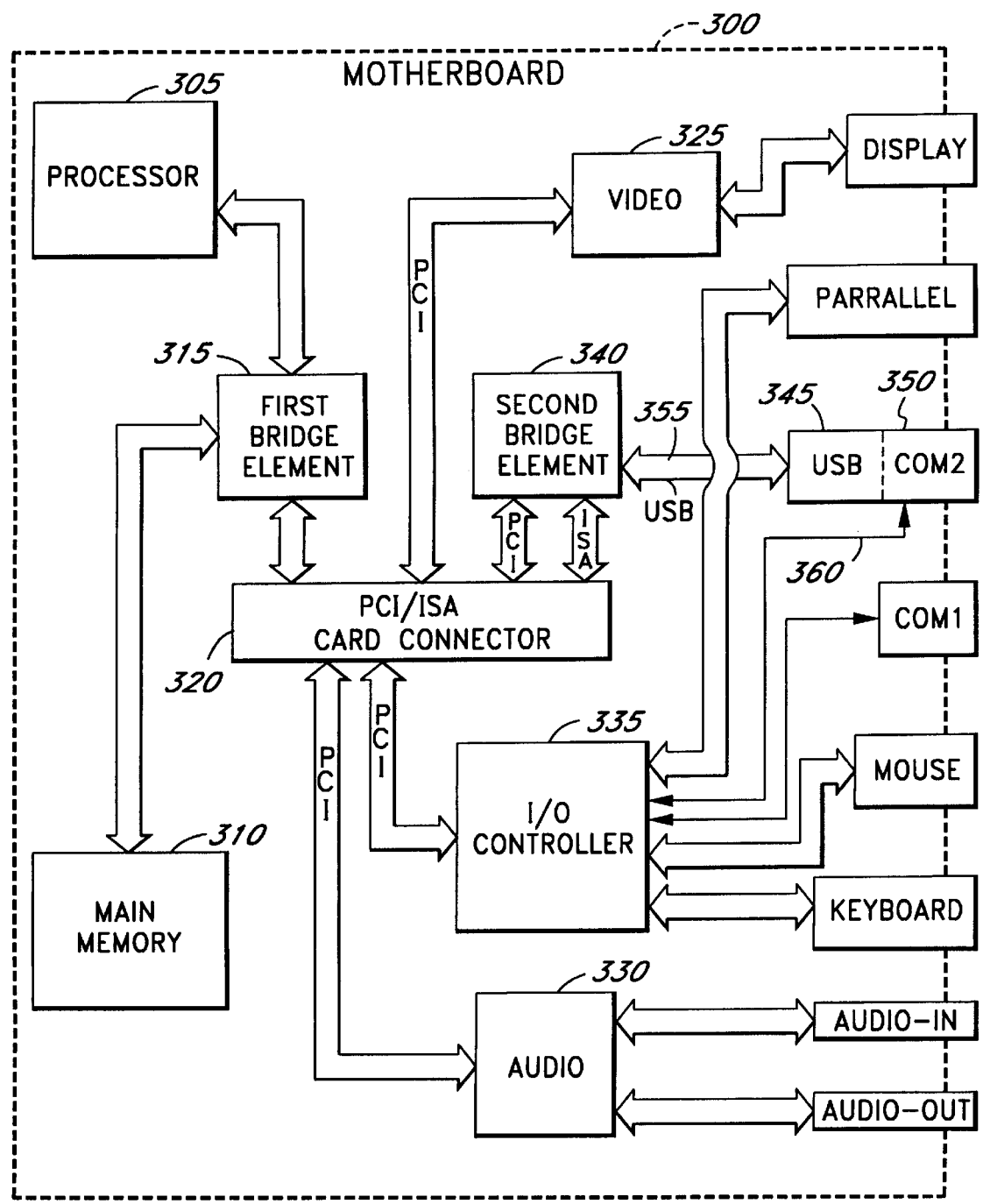
FIG. 4 is an illustrative block diagram of the motherboard implemented within the chassis of a PC which can accommodate a dual-in-line USB connector in lieu of the second COM port connector.

Referring to FIG. 4, a simplified embodiment of a circuit board, namely a motherboard 300 implemented within a chassis of a PC, is shown. The motherboard 300 comprises a processor 305 and main memory 310 which are coupled to a first bridge element 315 (e.g., a Triton™ II chip set manufactured by Intel Corporation of Santa Clara, Calif.). The first bridge element 315 is further coupled to a rise card connector 320 which operates as a receptacle for bus cards (not shown) such as, for example, a Peripheral Component Interconnect "PCI" bus and a Industry Standard Architecture "ISA" bus. Thus, the first bridge element 315 enables information to be exchanged between the processor 305 and main memory 310 and components coupled to the PCI bus, namely video components 325, audio components 330, an I/O controller 335 and a second bridge element 340 (e.g., a PCI-to-ISA bridge such as a PIIX3™ chip set manufactured by Intel Corporation). In the event that the dual-in-line USB connector 345 is connected in lieu of one of the COM port connectors (e.g., the COM2 port connector 350), the second bridge element 340 communicates with the dual-in-line USB connector 345 via USB bus lines 355 while a serial bus line 360 between the COM2 port connector 350 and the I/O controller 335 is disconnected. Otherwise, there is no connection to the second bridge element 340 via USB bus lines 355, but rather the serial bus line 360 connects the COM2 port connector 350 to the I/O controller 335.

Referring now to FIG. 5a, the illustrative, front view of the dual-in-line USB connector alternatively mounted onto the motherboard within the board space generally allotted for one of the COM port connector is shown. Having preferred width and height dimensions of approximately 1.26 inches and 0.419 inches respectively, the dual-in-line connector 345 includes two USB ports 400 and 405 oriented longitudinally adjacent to each other. Each USB port 400 and 405 is capable of establishing an electrical and mechanical connection with a USB adapter plug 410 and 415 associated with a USB-compatible peripheral. In its preferred embodiment, the body 420 of the dual-in-line connector 345 is made of a non-conductive material which typically is plastic to take advantage of injection molding. Widely recognized in the field, four conductor lines (not shown) are positioned within each USB port 400 and 405 to establish an electrical connection between a plurality of signal pins 435 and the USB adapter plugs 410 and 415 plugged into the USB ports 400 and 405. The dual-in-line connector 345 further includes a tin covering 425 which surrounds the non-conductive body 420 in order to reduce electromagnetic interference ("EMI") in accordance with FCC guidelines regarding noise control.

The dual-in-line connector 345 further includes a pair of mounting tabs 430a and 430b and the plurality of signal pins 435. The mounting tabs 430a and 430b are sized and spaced apart by approximately 0.986 inches to coincide with mounting holes used by the COM port connector as shown in FIG. 5d below. The plurality of signal pins 435, namely eight signal pins 435a–435h, are horizontally aligned and uniformly spaced by approximately 0.10 inches. The pin definitions are in compliance with USB Specification Revision 0.99 and are the following:

| PIN No. | DESCRIPTION |
| --- | --- |
| Pin 1 (435a) | $V_{cc}$ for USB Port 1 |
| Pin 2 (435b) | –DATA for USB Port 1 |
| Pin 3 (435c) | +DATA for USB Port 1 |
| Pin 4 (435d) | GND for USB Port 1 |
| Pin 5 (435e) | $V_{cc}$ for USB Port 2 |
| Pin 6 (435f) | –DATA for USB Port 2 |
| Pin 7 (435g) | +DATA for USB Port 2 |
| Pin 8 (435h) | GND for USB Port 2 |

Referring to FIG. 5b, the illustrative side view of the dual-in-line connector 345 is shown. Each mounting tab, for example a first mounting tab 430a, is laterally offset from the first USB port 400 of the dual-in-line USB connector 345 by approximately 0.356 inches in order to fit within the space reserved on the circuit board for the COM port connector. In addition, the first mounting tab 430a is laterally offset from the signal pins 435 by approximately 0.345 inches which provides sufficient separation to mount and couple EMI capacitors to the data pins of the COM port connector when the COM port connector is coupled to the motherboard in lieu of the dual-in-line USB connector. Such spacing is also shown in the board layout footprint of FIG. 5d.

Referring to FIG. 5c, the illustrative overhead view of the board layout footprint for the dual-in-line USB connector is shown. A pair of mounting holes 440a and 440b are cut into the motherboard 300 in order to receive the mounting tabs 430a and 430b, respectively. Upon the pair of mounting holes receiving the mounting tabs 430a and 430b, the signal pins 435a–435h of the dual-in-line connector 345 are inserted through corresponding signal pin holes 445a–445h which are appropriately arranged and uniformly spaced to coincide with the spacing between of the signal pins 435a–435h. As a result, the signal pins 435a–435h will be wave soldered to establish electrical connection with USB bus lines electrically coupled to the signal pin holes 445a–445h.

Referring now to FIG. 5d, the illustrative overhead view of the board layout footprint accommodating both the COM port connector or alternatively the dual-in-line USB connector is shown. The mounting holes 440a and 440b are cut into the motherboard 300 for use by either the COM port connector or the dual-inline USB connector. The lateral offset spacing between the signal pins holes 446 reserved for the COM port connector and the signal pin holes 445a–445h reserved for the dual-in-line USB connector is sufficient to enable EMI capacitors to be coupled to appropriate signal pins of the COM port connector if connected to the motherboard as well as the signal pins of the dual-in-line USB connector as shown in FIG. 6.

Figure 6:
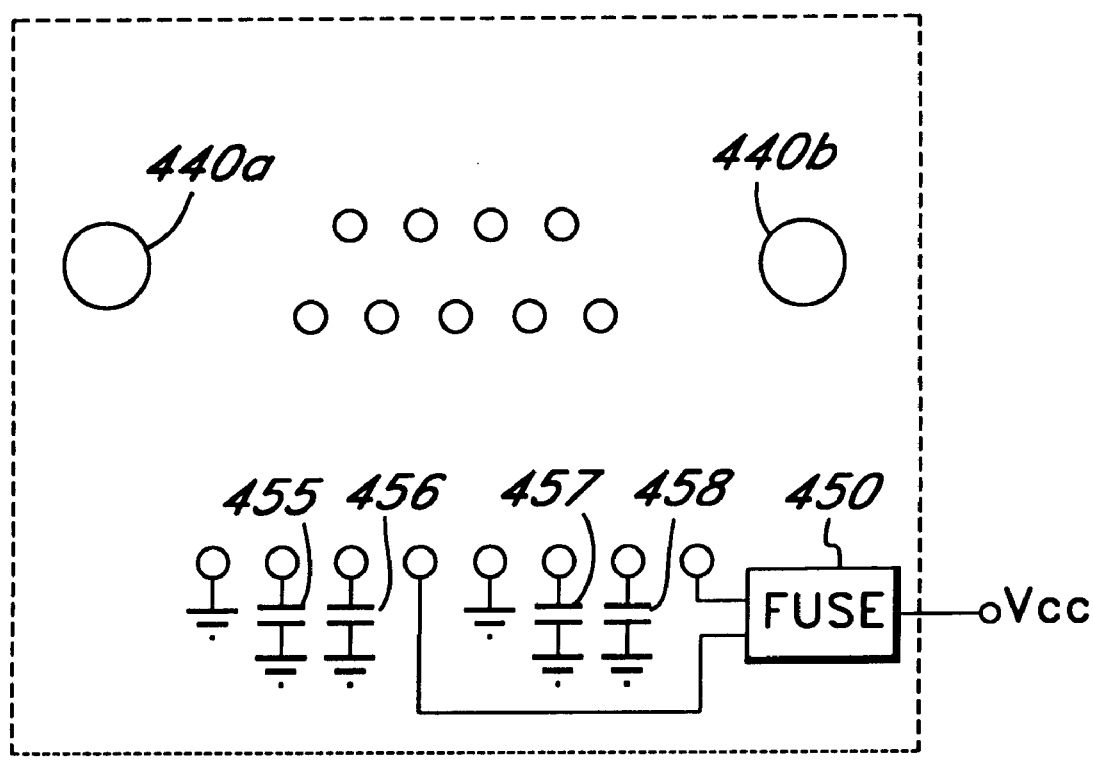
FIG. 6 is an illustrative overhead view of the board layout footprint required by the dual-in-line USB connector featuring EMI capacitors to reduce noise transmitted through its data pins.

Referring to FIG. 6, the illustrative overhead view featuring the EMI capacitors of the dual-in-line USB connector 345 is shown. Since the first and fifth signal pins 435a and 435e are coupled to ground, no EMI capacitor is needed for these pins. Likewise, the fourth and eighth signal pins 435d and 435h do not require EMI capacitors. These signal pins are coupled to a fuse 450 which would transfer a predetermined voltage "$V_{cc}$" to the dual-in-line USB capacitor. Thus, peripherals that currently do not contain power supplies can receive power from the dual-in-line USB connector. However, the second, third, sixth and seventh pins 435b, 435c, 435f and 435g are data pins that each require an EMI capacitor 455, 456, 457 and 458 to be coupled thereto, respectively.

The present invention described herein may be designed in many different embodiments and using many different spacing configurations. While the present invention has been described in terms of various embodiments, other embodiments may come to mind to those skilled in the art without departing from the spirit and scope of the present invention. The invention should, therefore, be measured in terms of the claims which follow.

What is claimed is:

1. A circuit board comprising:
   a first footprint to mount a device thereon; and
   a second footprint to support a Universal Serial Bus connector and a communication (COM) connector in the alternative, the second footprint including
   at least two mounting apertures,
   at least eight Universal Serial Bus (USB) signal pin apertures, the at least eight USB signal pin apertures being aligned and spaced equidistant from the at least two mounting apertures, and
   at least two sets of communication (COM) port apertures, a first set of COM port apertures laterally spaced to one side of a plane formed by the at least two mounting apertures and a second set of COM port apertures laterally spaced to an opposite side of the plane.

2. The circuit board according to claim 1, wherein the at least eight USB signal pin apertures include at least four USB signal pin apertures through which data is transferred, at least one USB signal pin aperture coupled to ground and at least one USB signal pin aperture coupled to power.

3. The circuit board according to claim 1, wherein the device associated with the first footprint includes a microprocessor.

4. The circuit board according to claim 1, wherein the device associated with the first footprint includes a communication (COM) connector.

5. The circuit board according to claim 1 further including a plurality of capacitors coupled to pins of the USB connector when inserted into the at least eight USB signal pin apertures.

6. The circuit board according to claim 5 further comprising a fuse coupled to the plurality of capacitors.

7. A circuit board comprising:

a first footprint for a first communication (COM) connector thereon; and a second footprint for supporting of a Universal Serial Bus (USB) connector and a second COM connector in the alternative, the second footprint including at least two mounting apertures, a first plurality of signal pin apertures provided for a Universal Serial Bus connector, the first plurality of signal pin apertures being generally aligned and spaced equidistant from a plane including the at least two mounting apertures, and at least two sets of COM port apertures laterally adjacent to each other, a first set of COM port apertures laterally spaced from the plane in a first direction and a second set of COM port apertures laterally spaced from the plane in a direction opposite the first direction.

8. The circuit board according to claim 7, wherein the first plurality of signal pin apertures placed in a distance not exceeding a distance between the at least two mounting apertures.

9. The circuit board according to claim 7 further including a plurality of capacitors coupled to pins of the USB connector when inserted into the first plurality of signal pin apertures.

10. The circuit board according to claim 9 further comprising a fuse coupled to the plurality of capacitors.

11. The circuit board according to claim 10, wherein the fuse to provide voltage to a device off the circuit board.

12. The circuit board according to claim 10, wherein the fuse to provide voltage to a device off the circuit board.

13. A circuit board comprising:

a footprint for supporting an input/output controller; and a footprint for supporting of a Universal Serial Bus (USB) connector and a serial communication (COM) connector in the alternative, the footprint including at least two mounting apertures, a first plurality of signal pin apertures provided for the USB connector, the first plurality of signal pin apertures being generally aligned and spaced equidistant from a plane formed by the at least two mounting apertures, and at least two sets of COM port apertures laterally adjacent to each other, a first set of COM port apertures laterally spaced from the plane in a first direction and a second set of COM port apertures laterally spaced from the plane in a direction opposite the first direction.

14. The circuit board according to claim 13, wherein the first plurality of signal pin apertures placed in a distance not exceeding a distance between the at least two mounting apertures.

15. The circuit board according to claim 13 further including a plurality of capacitors coupled to the USB connector when inserted into the first plurality of signal pin apertures.

16. The circuit board according to claim 15 further comprising a fuse coupled to the plurality of capacitors.

17. The circuit board according to claim 16, wherein the fuse provides voltage to a device off the circuit board.

* * * * *